(12) United States Patent
Fischer

(10) Patent No.: US 11,092,001 B2
(45) Date of Patent: Aug. 17, 2021

(54) LOCATING A DRILL HEAD OF A GROUND DRILLING DEVICE

(71) Applicant: TRACTO-TECHNIK GMBH & CO. KG, Lennestadt (DE)

(72) Inventor: Sebastian Fischer, Lennestadt (DE)

(73) Assignee: TRACTO-TECHNIK GmbH & Co. KG, Lennestadt (DE)

( * ) Notice: Subject to any disclaimer, the term of this patent is extended or adjusted under 35 U.S.C. 154(b) by 0 days.

(21) Appl. No.: 16/467,331

(22) PCT Filed: Dec. 21, 2017

(86) PCT No.: PCT/EP2017/084187
§ 371 (c)(1),
(2) Date: Jun. 6, 2019

(87) PCT Pub. No.: WO2018/115334
PCT Pub. Date: Jun. 28, 2018

(65) Prior Publication Data
US 2020/0072041 A1 Mar. 5, 2020

(30) Foreign Application Priority Data
Dec. 21, 2016 (DE) .................... 10 2016 015 194.3

(51) Int. Cl.
*E21B 47/092* (2012.01)
*E21B 47/0232* (2012.01)
*E21B 7/04* (2006.01)

(52) U.S. Cl.
CPC ........ *E21B 47/092* (2020.05); *E21B 47/0232* (2020.05); *E21B 7/046* (2013.01)

(58) Field of Classification Search
CPC .... E21B 47/092; E21B 47/0232; E21B 47/13; E21B 7/046
See application file for complete search history.

(56) References Cited

U.S. PATENT DOCUMENTS

| | | | |
|---|---|---|---|
| 2014/0236390 A1* | 8/2014 | Mohamadi | B64C 29/00 701/2 |
| 2016/0018551 A1* | 1/2016 | Cole | G01V 3/165 324/329 |
| 2016/0360562 A1* | 12/2016 | Chong | H04W 4/025 |

FOREIGN PATENT DOCUMENTS

| | | |
|---|---|---|
| DE | 102012216162 A1 | 10/2013 |
| EP | 1659365 A1 | 5/2006 |
| WO | 20150073687 A1 | 5/2015 |
| WO | 20150168417 A1 | 11/2015 |

OTHER PUBLICATIONS https://www.collinsdictionary.com/dictionary/english/pattern (Year: 2020).*

* cited by examiner

*Primary Examiner* — David Carroll
(74) *Attorney, Agent, or Firm* — Howard IP Law Group, PC

(57) ABSTRACT

The invention relates to a device for locating a drill head of a ground drilling device, comprising a wireless probe, the probe being arranged on or in a flying object.

18 Claims, 2 Drawing Sheets

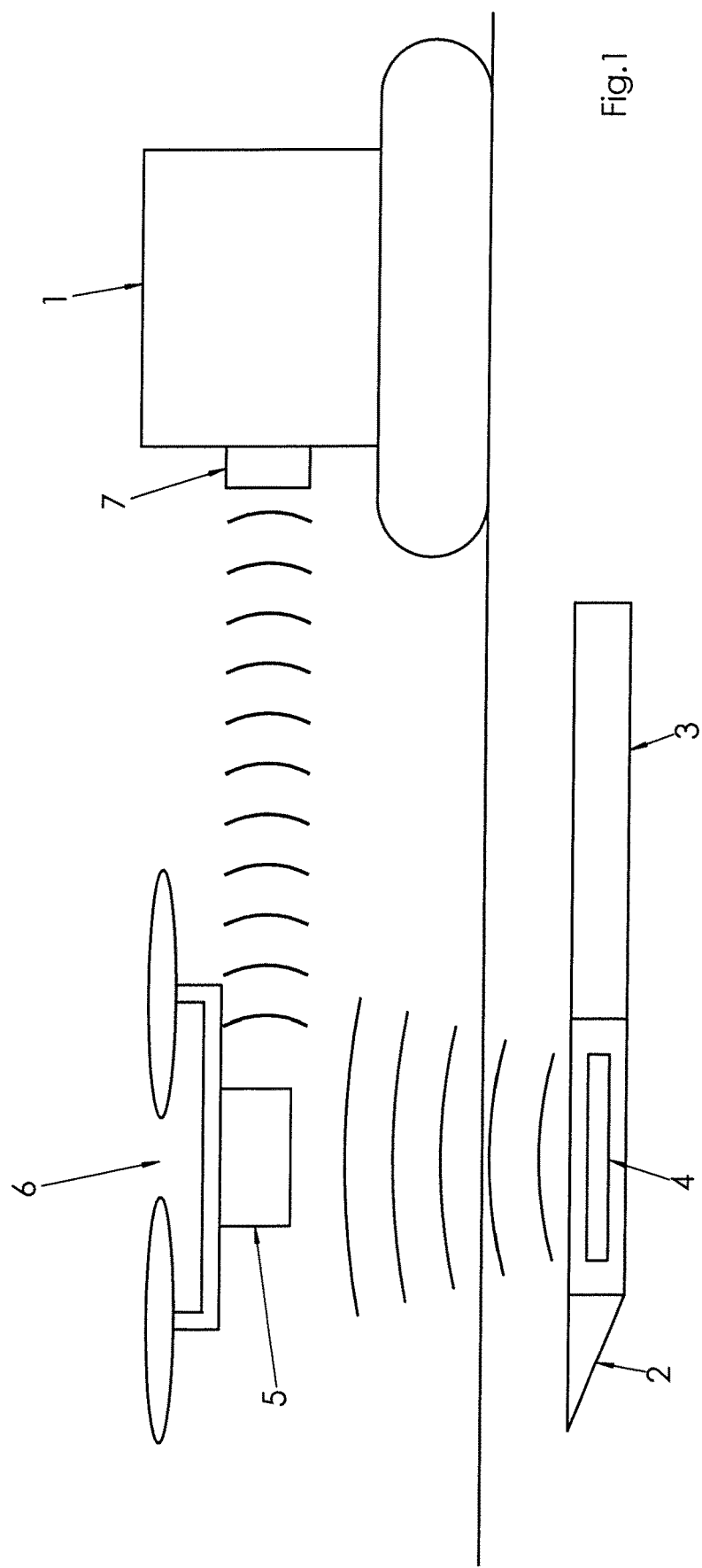

US 11,092,001 B2

LOCATING A DRILL HEAD OF A GROUND DRILLING DEVICE

CROSS-REFERENCE TO RELATED APPLICATIONS

Figure 2B:
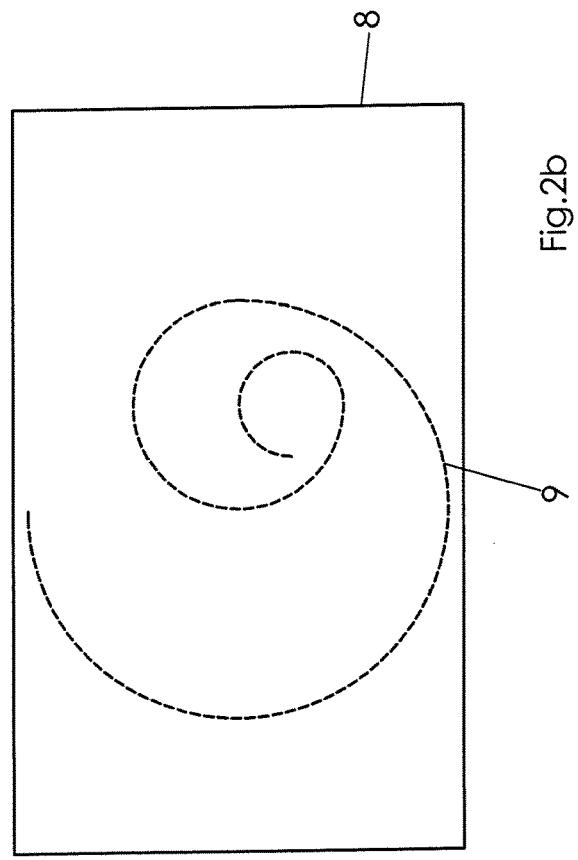

This application is the national stage application under 35 U.S.C. § 371 of International Application No. PCT/EP2017/084187 filed on 21 Dec. 2017, and claims the benefit of DE 10 2016 015 194.3 filed on 21 Dec. 2016, the entire disclosures of which are incorporated herein by reference in their entireties.

The invention relates to a device and a method for locating a drill head of a ground drilling device, a system comprising the device, and a use during the locating of a drill head of a ground drilling device.

In the case of a ground drilling device, a drill head is introduced into the earth in order to produce an earth borehole. While the introducing of the earth borehole can be steered through the parameters of the inclination and the advance of the drill head, a deflecting of the drill head may occur, especially due to obstacles present in the earth. It is therefore desirable to locate the drill head during the process of introducing the earth borehole, so as to ascertain the present course of the borehole. A directional control of the drill head may be undertaken.

For purposes of the locating of the drill head, a transmitter may be arranged in the region of the drill head, which can be detected by means of one or more receivers. For example, the transmitter may beam out electromagnetic waves, which one or more receivers can recognize. It may be provided that a receiver can be moved as a so-called walk-over receiver relative to the transmitter. In this case, the user moves the walk-over receiver over the ground in which the borehole is being made, and a signal is obtained at the walk-over receiver in dependence on the position of the walk-over receiver relative to the transmitter, so that the user who is walking across the ground with the receiver can determine the location of the transmitter. But it is also possible to provide one or more stationary receivers, which can be arranged stationary on the drilling device or in any desired location for the measurement, the relative position to the drilling device and the target position of the drill head each being known. In order to determine the maximum range of a receiver and to increase it, various positions may be calibrated; the receiver during the measurement process is then moved each time to the next position. But it may also be provided to measure various points in a sequence, so that multiple transmitters are used, such as one transmitter on the drill head or one transmitter on the drilling device. In this case, the receiver may be used as a walk-over receiver, and the measurement of two points allows an absolute measurement in a system of coordinates formed by the transmitters.

It has been found that the locating of the drill head is relatively costly, making use of the signal of multiple receivers, and/or only one person is involved in the task of locating the drill head.

Therefore, the problem which the invention proposes to solve is to create an improved device and an improved method for locating a drill head of a ground drilling device and an improved use during the locating of a drill head of a ground drilling device, allowing a faster locating of the drill head of a ground drilling device with good detection of the drill head.

The problem is solved by the subject matter of the independent patent claims. Advantageous modifications of the subject matter of the independent patent claims are the subject matter of the respective dependent patent claims and will emerge from the following specification.

The key notion of the invention is to arrange the probe used for the locating of the drill head on or in a flying object. In this way, among other things, a faster speed of the probe moved across the earth can be achieved. It is also possible to move a probe quickly over poorly passable ground, such as moors, morasses and/or water. Furthermore, the invention has found that by situating a probe in or on a flying object it becomes independent of the ground conditions present on top of the earth in which the borehole is being made.

The invention creates a device for the locating of a drill head of a ground drilling device. The device comprises a wireless probe and the probe is arranged in or on a flying object.

The term "probe" in the sense of the specification encompasses a device or an apparatus, especially a measuring apparatus or a measuring probe. The probe may serve in particular as a receiver for a signal in order to locate a transmitter which is sending the signal. The transmitter may be arranged in the area of the drill head or on it. So far as regards a locating of the drill head of the ground drilling device itself, this encompasses not only the drill head front or the midpoint of the drill head, but also a locating of the drill string in the vicinity of the drill head. The location of the transmitter or the element on the drill string being detected by the probe can define the region which is located by the probe. An arrangement of a transmitter or an element being detected by the probe may be situated in the area of the drill head or a section of the drill string following the drill head. For this, a holder may be provided for a transmitter. Most especially preferably, a transmitter may be provided in a section directly behind the drill head in the drill string or on the drill head itself. The transmitter may also be provided in a section following the drill head.

The term "ground drilling device" encompasses any device which moves a drill string, especially one having short lengths of drill rods, in an existing channel in the earth or one being created in order to produce and/or widen an earth borehole, especially a horizontal drilling (HD), and/or to pull pipelines or other elongated objects into the earth. The ground drilling device may be in particular a HD device. A ground drilling device may operate in particular by displacing earth. With the ground drilling device, the drill string can be introduced by rotation and/or translation in the longitudinally axial direction of the drill string into the earth.

The term "HD" (horizontal drilling) in the sense of the specification encompasses in particular every type of existing or yet to be produced channels, preferably horizontal channels in a body, especially earth channels, including earth boreholes, rock boreholes, or earth conduits, as well as underground or aboveground pipelines and water canals which can be produced or laid by the use of a corresponding ground drilling device.

The term "flying object" in the sense of the specification encompasses an aircraft, especially an unmanned aircraft. The flying object may be, for example, an unmanned model airplane, especially one in the form of a collision-tolerant or collision-secure drone. The flying object may comprise one or more distance sensors, with which an independent flying is made possible, without collision. The flying object in particular may have an accumulator or a rechargeable battery. The flying object may be operated and navigated independently by a computer or from the ground by a remote control. For example, the flying object may be an airplane or especially a flying object that takes off and lands in the manner of a helicopter. In particular, the flying object is preferably a multicopter, especially a quadrocopter.

In one preferred embodiment, the flying object can follow the movement of the drill head. Once the probe has located the drill head, the probe can hover above the drill head while the earth borehole is produced.

In one preferred embodiment, the device is actuated by means of a program, which is stored in a memory of the device, and which is adapted such that the flying object flies in a predetermined pattern. In this way, a drill head can be located in a larger region; the region beneath the surface can be systematically explored. The pattern may be designed such that a line by line scanning or sweeping of a region is possible, especially a rectangular region. For this, the pattern may involve a linear movement in a first direction, followed by a linear movement transversely to the first direction. The movement in the first direction may be longer than the immediately following movement. It may also be provided in addition or alternatively that the pattern comprises a zig zag pattern. It may also be that the pattern does not contain linear elements, in particular, the pattern may have the form of a spiral. Thanks to the use of a pattern, an independent device can be created, which "finds" the drill head in a region and then "follows" the drill head.

The term "device" in the sense of the specification encompasses the flying object with the probe. The device may include a control unit, which stands in wireless contact with the probe and/or the flying object. The device may include a program which can evaluate and record the signal of the transmitter received from the probe or a signal coordinated with the signal of the transmitter. In this way, the progress of the borehole being created can be registered. In event of deviations from the target position of the borehole, an intervention can be done in the control of the ground drilling device in dependence on the signal of the program. This intervention may be done by the user or occur automatically. For this, the program and the ground drilling device may be coupled together. In particular, the program may be executed on a computer, microcontroller or the like of the ground drilling device. With the aid of the program data, the ground drilling device may be configured such, for example by means of a further program or the same program, as to intervene in the control of the earth borehole and/or perform an improvement in the course of the borehole.

In one preferred embodiment, a region can be entered at an input device, determining a region which can be flown over by the flying object. The input device may be designed as a keypad, TouchPad, TrackBall, mouse, or other familiar input device, especially in connection with a display device which can indicate a visual representation corresponding to the region, for the entry of coordinates or parameters corresponding to the coordinates. In this way, the flying object in the search for the drill head may at first be confined to a certain region where the drill head of the ground drilling device is suspected to be. The speed of determining the location of the drill head can be made faster.

The invention also creates a system comprising an aforementioned device. The device moreover comprises a drill head or a section of a drill string following the drill head. In the drill head or the section there is devised a holder for a transmitter. In this way, a system can be created in which a transmitter can be attuned to the probe and used for faster locating of the drill head or the section. In one preferred embodiment, the system also comprises the transmitter.

The invention also creates a method for locating a drill head of a ground drilling device, wherein a probe is moved over the earth. The earth is overflown by means of a flying object, and the probe is arranged on or in the flying object. The term "over" in the sense of the specification means that the probe can be moved or flown not on the ground, but above it, namely, at a distance from it, without having any direct contact. Remarks on the device for locating a drill head of a ground drilling device apply analogously to the method.

In one preferred embodiment, the earth is flown over in a predetermined pattern.

In one preferred embodiment, a region is entered which is overflown by the flying object.

The invention also creates a use during the locating a drill head of a ground drilling device, wherein a wireless probe is used to locate the drill head. A flying object is used, the probe being arranged on or in it. Remarks on the device for locating a drill head of a ground drilling device and on the method for locating a drill head of a ground drilling device apply analogously to the use.

The preceding remarks as well as the following specification of exemplary embodiments do not represent any waiving of particular embodiments or features.

The invention shall now be explained more closely with the aid of exemplary embodiments represented in the drawing.

Figure 2A:
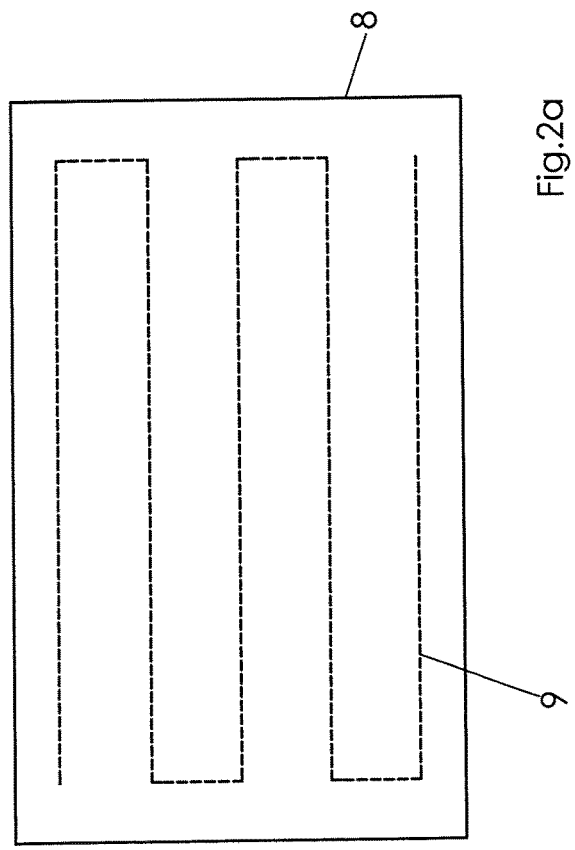

There are shown in the drawings:

FIG. 1 a schematic representation of a device for locating a drill head of a ground drilling device;

FIG. 2a, b patterns for a region below which a drill head being located is situated, and how the region can be overflown.

FIG. 1 shows a ground drilling device 1 with which an earth borehole is being made in the earth. The ground drilling device 1 drives a drill head 2 into the earth. The drill head 2 is arranged at the end of a drill string 3. A transmitter 4, which is arranged in the drill head 2 or in a section of the drill string 3 following the drill head 2, sends out electromagnetic signals. The electromagnetic signals can be received by a probe 5. By means of the probe 5, the transmitter 4 can be located in the earth. By locating the transmitter 4, it is possible to locate the drill head 2. The probe 5 is arranged on a flying object 6. Besides a receiver for the electromagnetic signals of the transmitter 4, the probe 5 comprises a transmitter which in turn sends out a signal which can be received by a receiver 7 on the ground drilling device 1. The signal which is sent by the probe 5 to the receiver 7 can be coordinated with a position in space and points to the location of the transmitter 4, so that the location of the transmitter 4 is known at the ground drilling device 1. From the determined location of the transmitter 4, a deviation from the target position of the earth borehole being made can be determined and steps taken to counteract any deviation.

FIG. 2a shows schematically a substantially rectangular region 8 beneath which a drill head 2 with the transmitter 4 is suspected to be. The flying object 6 can overfly the region 8 in a predetermined pattern 9, which contains line-shaped regions. The pattern 9 is shown by broken lines in FIG. 2a. In this way, a region 8 can be systematically overflown in order to locate a drill head 2. FIG. 2b likewise shows a region 8 beneath which a drill head 2 is suspected to be, and which is being located. The region 8 can be overflown by means of the flying object 6 on which the probe 5 is arranged by means of the spiral pattern 9 represented in FIG. 2b. When the location of the probe 5 is determined, a deviation from the pattern 9 can be done and the probe 5 can be optimized by means of the flying object 6 to the location of the transmitter 4.

The invention claimed is:

1. A device for locating a drill head of a ground drilling device, comprising:
   a wireless probe arranged on or in a flying object; and
   a memory arranged on or in the flying object storing a program configured to fly the flying object in a predetermined pattern to locate the drill head using the wireless probe, wherein the pattern comprises one or more of a line-by-line pattern, a zig-zag pattern, or a spiral pattern.

2. The device according to claim 1, further comprising an input device for inputting a region to be flown over by the flying object according to the predetermined pattern.

3. The device of claim 1, wherein the wireless probe comprises a probe receiver configured to receive a first signal from a drill head transmitter on the drill head.

4. The device of claim 1, wherein the memory is further configured to, responsive to locating the drill head, discontinue flying the flying object in the predetermined pattern and fly the flying object to hover over the drill head.

5. A method for locating a drill head of a ground drilling device, comprising:
   overflying the earth according to a predetermined pattern stored in a memory with a probe arranged on or in a flying object to locate the drill head, wherein the predetermined pattern comprises one or more of a line-by-line pattern, a zig-zag pattern, or a spiral pattern.

6. The method according to claim 5, further comprising inputting a region to be overflown by the probe arranged on or in the flying object according to the predetermined pattern.

7. The method of claim 5, further comprising receiving, by a probe receiver of the wireless probe, a first signal from a drill head transmitter on the drill head.

8. The method of claim 5, further comprising, responsive to locating the drill head, discontinuing overflying the flying object in the predetermined pattern and overflying the flying object to hover over the drill head.

9. A system comprising:
   a ground drilling device comprising one of a drill head or a section of a drill string following the drill head, wherein the one of the drill head or the section of the drill string comprises a holder for a drill head transmitter; and
   a device for locating a drill head of a ground drilling device comprising:
      a wireless probe configured for arrangement on or in a flying object and for receiving a first signal from the drill head transmitter in the holder; and
      a memory arranged on or in the flying object storing a program configured to fly the flying object in a predetermined pattern to locate the drill head using the wireless probe;
   wherein the wireless probe comprises:
      a probe receiver configured to receive the first signal from the drill head transmitter; and
      a probe transmitter configured to transmit a second signal, based upon the first signal and corresponding to a location of the drill head transmitter, to a drilling device receiver on the ground drilling device, wherein the ground drilling device is configured to adjust a course of the drill head based upon the second signal.

10. The system of claim 9, wherein the device for locating the drill head further comprises an input device for inputting a region to be flown over by the flying object according to the predetermined pattern.

11. The system of claim 9, wherein the memory is further configured to, responsive to locating the drill head, discontinue flying the flying object in the predetermined pattern and fly the flying object to hover over the drill head.

12. A device for locating a drill head of a ground drilling device comprising:
   a wireless probe arranged on or in a flying object; and
   a memory arranged on or in the flying object storing a program configured to fly the flying object in a predetermined pattern, independent of the location of the drill head, to locate the drill head using the wireless probe;
   wherein the wireless probe comprises:
      a probe receiver configured to receive a first signal from a drill head transmitter on the drill head; and
      a probe transmitter configured to transmit a second signal, based upon the first signal and corresponding to a location of the drill head transmitter, to a drilling device receiver on the ground drilling device, wherein the ground drilling device is configured to adjust a course of the drill head based upon the second signal.

13. The device of claim 12, wherein the predetermined pattern comprises one or more of a line-by-line pattern, a zig-zag pattern, or a spiral pattern.

14. A system comprising:
   a ground drilling device comprising one of a drill head or a section of a drill string following the drill head, wherein the one of the drill head or the section of the drill string comprises a holder for a drill head transmitter; and
   a device for locating a drill head of a ground drilling device comprising:
      a wireless probe configured for arrangement on or in a flying object and for receiving a first signal from the drill head transmitter in the holder; and
      a memory arranged on or in the flying object storing a program configured to fly the flying object in a predetermined pattern to locate the drill head using the wireless probe;
   wherein in the pattern comprises one or more of a line-by-line pattern, a zig-zag pattern, or a spiral pattern.

15. The system of claim 14, wherein the wireless probe comprises a probe receiver configured to receive the first signal from the drill head transmitter.

16. The system of claim 15, wherein the wireless probe further comprises a probe transmitter configured to transmit a second signal, based upon the first signal and corresponding to a location of the drill head transmitter, to a drilling device receiver on the ground drilling device, wherein the ground drilling device is configured to adjust a course of the drill head based upon the second signal.

17. A method for locating a drill head of a ground drilling device, comprising:
   overflying the earth according to a predetermined pattern stored in a memory with a probe arranged on or in a flying object to locate the drill head;
   receiving, by a probe receiver of the wireless probe, a first signal from a drill head transmitter on the drill head; and
   transmitting, by a probe transmitter of the wireless probe, a second signal, based upon the first signal and corresponding to a location of the drill head transmitter, to a drilling device receiver on the ground drilling device, wherein the ground drilling device is configured to adjust a course of the drill head based upon the second signal.

18. The method of claim 17, wherein overflying the earth with the probe on or in the flying object according to a predetermined pattern comprises overflying the earth with the probe on or in the flying object according to one or more of a line-by-line pattern, a zig-zag pattern, or a spiral pattern.

* * * * *